United States Patent [19]
Hons et al.

[11] Patent Number: 5,397,491
[45] Date of Patent: Mar. 14, 1995

[54] USE OF SUBSTITUTED DIPHENYLS AS HEAT TRANSFER FLUIDS

[75] Inventors: Gerd Hons, Herne; Heinz-Werner Voges, Dorsten, both of Germany

[73] Assignee: Huels Aktiengesellschaft, Marl, Germany

[21] Appl. No.: 886,150

[22] Filed: May 21, 1992

[30] Foreign Application Priority Data

Jul. 31, 1991 [DE] Germany .................. 41 25 261.6

[51] Int. Cl.⁶ .............................................. C09K 5/00
[52] U.S. Cl. ................................. 252/73; 252/570; 585/1; 585/24; 585/25; 585/26
[58] Field of Search ............... 252/73, 570; 585/1, 585/25, 26, 24

[56] References Cited

U.S. PATENT DOCUMENTS

| | | | |
|---|---|---|---|
| 2,172,391 | 9/1939 | Krase | 252/73 |
| 3,446,864 | 5/1969 | Puskas et al. | 585/25 |
| 3,907,696 | 9/1975 | Jackson et al. | 252/73 |
| 4,622,160 | 11/1986 | Buske et al. | 252/570 |

FOREIGN PATENT DOCUMENTS

63-262284  4/1988  Japan .

Primary Examiner—Paul Lieberman
Assistant Examiner—Necholus Ogden
Attorney, Agent, or Firm—Oblon, Spivak, McClelland, Maier & Neustadt

[57] ABSTRACT

Heat is transferred in a thermodynamic system with a heat transfer medium which is at least one fluid of formula I and/or II,

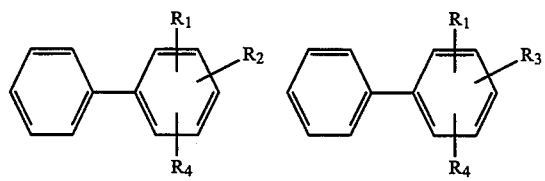

wherein $R_1$ is ethyl or hydrogen, $R_2$ is ethyl, $R_3$ is methyl and $R_4$ is a benzyl radical.

5 Claims, No Drawings

USE OF SUBSTITUTED DIPHENYLS AS HEAT TRANSFER FLUIDS

BACKGROUND OF THE INVENTION

1. Field of the Invention

The present invention relates to substituted diphenyls of formulae I and II:

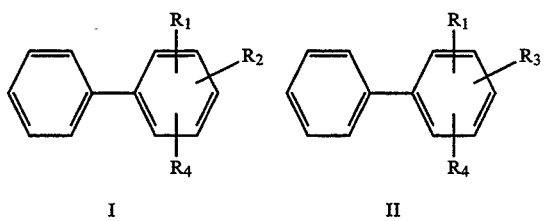

which can be additionally mixed with substituted diphenyls of formulae III and IV

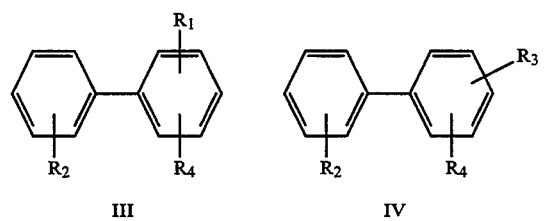

and their use as heat transfer fluids. In the formulae $R_1$ stands for hydrogen or ethyl, $R_2$ for ethyl, $R_3$ for methyl and $R_4$ for the benzyl radical.

DESCRIPTION OF THE BACKGROUND

Heat transfer fluids (herein also referred to as heat carriers), are used to transfer heat energy between thermodynamic systems of different temperature. Heat carriers are to be understood, in the sense of the present invention, to be fluids which are able to supply heat energy to a medium or to remove heat energy from a medium via a heat exchange unit.

In a narrower sense, the invention relates to heat carriers which can be utilized over a wide temperature range, i.e. from about −25° C. to about 390° C. In order for heat carriers to be employable under operational conditions over the above wide temperature range, they must possess a number of specific properties, including:
1. high boiling point at normal pressure;
2. liquid state of aggregation at the required low temperatures;
3. marked thermal stability;
4. low sensitivity to oxidation;
5. good heat transport and heat transfer characteristics;
6. low corrosive action on equipment materials;
7. low flammability;
8. favorable physiological properties (low toxicity);
9. environmental acceptability;
10. capacity for regeneration; and
11. economy The heat carrier used most frequently in industry is water; but this can only be used, for known reasons, over a narrow temperature range. Mineral oils and synthetic heat carriers are also widely used in industry. In general, mineral oils can be used in a high temperature range only up to temperatures of about 250° C. Above about 250° C. mineral oils increasingly undergo cracking with the formation of gaseous products, manifested by sludge formation. Above 250° C. synthetic heat carriers are used. The following are known as synthetic heat carriers: biphenyl/diphenyl oxide mixtures, partially hydrogenated terphenyls, benzyltoluenes, ditolyl ethers, aryl silicates and phenylsilicones. However, the majority of these products have attained only little practical significance, because they are used mainly in the regions where water or mineral oils are more commonly used, which are per se more reasonably priced. Furthermore, they usually commence to decompose at high temperatures and can then no longer be regenerated, others are too costly and again others make severe demands on work safety. A need therefore continues to exist for materials which possess improved thermal stability as a heat transfer medium.

SUMMARY OF THE INVENTION

Accordingly, one object of the present invention is to provide a heat transfer medium which exhibits improved stability at high temperatures.

Briefly, this object and other objects of the present invention as hereinafter will become more readily apparent can be attained by one or more compounds of formula I and/or II,

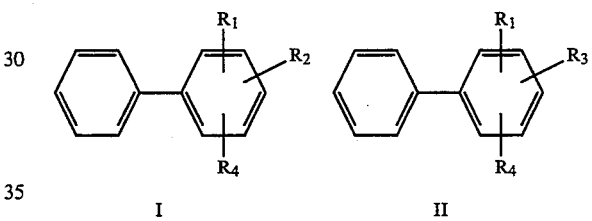

in which $R_1$ stands for ethyl or hydrogen, $R_2$ for ethyl, $R_3$ for methyl and $R_4$ for a benzyl radical, as a heat transfer fluid. The fluid may additionally contain one or more compounds of formulae III and/or IV, wherein $R_1$ to $R_4$ are as defined above:

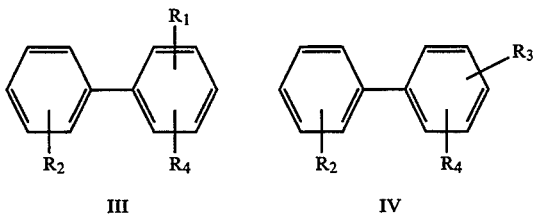

DESCRIPTION OF THE PREFERRED EMBODIMENTS

The heat transfer fluid of the invention has favorable viscosity characteristics at lower temperature ranges and has excellent thermal stability in the upper temperature range up to an initial cot temperature of about 370° C.

The heat transfer fluid of the invention is particularly characterized by an exceptionally low tendency to form low-boiling and in particular high-boiling fractions. Under the effect of high-boiling fractions the heat transfer characteristics of the heat carrier are adversely altered. In extreme cases the high-boiling fractions separate out on the walls of the heat exchanger tubing from a certain concentration because of their poor solubility.

These fractions carbonize and drastically impair heat transfer. This drawback is overcome by the fluid of the present invention.

A further advantage of the present heat transfer medium is ease of regeneration. A particularly advantageous characteristic of the fluid according to the invention is the wide range of temperatures over which it remains in liquid form, the lower limit being −26° C.

In a preferred embodiment of the invention, the heat transfer fluid consists of benzylethyldiphenyl, benzylethylmethyldiphenyl, benyldiethyldiphenyl, benzyldiethylmethyldiphenyl, benzylmethyldiphenyl, and mixtures thereof and can be used up to an initial temperature of 370° C. and a film temperature of 390° C. These properties represent a significant advantage over the properties of known synthetic heat transfer media.

The heat transfer fluid of the invention can be prepared by a known process such as, for example, successive ethylation and benzylation of diphenyl in the presence of a Friedel-Crafts catalyst.

The industrial advantages of the fluid of the present invention become clear by comparison with two examples of heat carriers already used in industry, i.e. the partially hydrogenated terphenyls (comparison fluid A) and dibenzylated toluene (comparison fluid B). Table 1 provides a summary of the physical properties which do not point to any particular advantages of the fluids according to the invention except for certain advantages of comparison fluid B in the low temperature range (lower viscosity) and certain drawbacks of the comparison fluid B in the high temperature range (higher proportion of low-boiling fractions).

The significant and industrially crucial advantages of the fluid of the present invention are apparent from Table 2. This table contains boiling analyses of the heat carriers in their virgin state (original products before use) and after heat exposure tests carried out in each case over 500 hours in steel pressure vessels at 350°, 360° and 370° C. The boiling analyses were carried out according to ASTM 1078.

It is apparent that the comparison fluids change when subjected to heat to a considerably greater extent than the fluid according to the present invention. Thus the tendency to form low-boiling fractions (thermal degradation, cracking) of the comparison fluid A is greater than that of the fluid of the present invention, while the proportion of high-boiling fractions in the comparison fluid B increases to a much greater extent.

Decomposition of the comparison fluids A and B increases with increasing temperature (350° C./370° C.) to a much greater extent than is the case with the fluid of the present invention. This becomes especially clear when the boiling characteristics of the virgin, original fluids are compared with their boiling characteristics after a heat exposure at 370° C. over 500 hours (see Table 2). On the one hand, the original fluids are completely (fluid according to the invention and comparison fluid B) or almost completely (comparison fluid A) distillable up to the ASTM 1078 limit temperature of 400° C. On the other hand, only 80% of the comparison fluid A is (after heat exposure at 370° C.) distillable up to 400° C. and as little as 60% of the comparison fluid B is distillable, while not less than 95% of the fluid according to the invention remains distillable. From this boiling analysis, standardized according to ASTM 1078, it is obvious that in the comparison fluid A about 20% and in the comparison fluid B as much as about 40% of undesirable high-boiling compounds have formed when subjected to heat at 370° C. over 500 hours, while in the fluid according to the invention the formation of such high-boiling fractions takes place only to a comparatively small extent of about 5%.

This indicates that the fluid according to the invention can be industrially utilized as a heat transfer fluid even at 370° C., while the comparison fluids A and B do not withstand a prolonged heat exposure at 370° C. The advantages of higher thermal stability of the fluid according to the invention are also valid for a long-term heat exposure temperature lower by 10° C. of 360° C. and, when the fluid B is included in the comparison, even for a longterm heat exposure temperature of 350° C., as shown by the test data of Table 2.

TABLE 1

| Property | Physical properties | | |
|---|---|---|---|
| | Fluid of the invention | Comparison fluid A | Comparison fluid B |
| Boiling range in °C. | | | |
| at 10% | 360 | 340 | 370 |
| 90% according to ASTM 1078 | 380 | 390 | 380 |
| Flash point (°C.) according to DIN 51376 | 196 | 178 | 190 |
| Ignition temp. (°C.) according to DIN 51794 | 415 | 374 | >500 |
| Viscosity at 20° C. (mm²/s) according to DIN 51562 | 110 | 100 | 40 |
| Solidification point (°C.) according to DIN 51597 | −26 | −28 | −35 |
| Specific heat at 20° C. (J/g · grd.) | 1.62 | 1.60 | 1.58 |

Comparison Fluid A: partially hydrogenated terphenyl
Comparison Fluid B: dibenzylated toluene
Composition of the fluid of the present invention tested: 54% benzylethyldiphenyl, 28% ethylmethylbenzyldiphenyl, 3% benzylmethyldiphenyl, 15% diethylbenzyldiphenyl.

TABLE 2

Boiling analyses
All heat carriers were heat treated in a pressure vessel at the temperatures stated over 500 hours.
The evaluation is carried out according to ASTM 1078.

| % by vol. | Fluid of the present invention | | | | Comparison fluid A | | | | Comparison fluid B | | | |
|---|---|---|---|---|---|---|---|---|---|---|---|---|
| | Orig. | 350° C. | 360° C. | 370° C. | Orig. | 350° C. | 360° C. | 370° C. | Orig. | 350° C. | 360° C. | 370° C. |
| 1st drops (start of boiling) | 342 | 114 | 110 | 115 | 338 | 100 | 95 | 95 | 348 | 102 | 102 | 102 |
| 5 | 352 | 300 | 220 | 134 | 339 | 146 | 135 | 120 | 368 | 244 | 150 | 148 |
| 10 | 357 | 345 | 337 | 348 | 340 | 314 | 230 | 210 | 372 | 302 | 250 | 250 |
| 20 | 361 | 352 | 351 | 355 | 342 | 335 | 315 | 310 | 373 | 366 | 360 | 360 |
| 30 | 361 | 360 | 357 | 356 | 343 | 340 | 332 | 325 | 374 | 374 | 369 | 375 |
| 40 | 366 | 362 | 363 | 357 | 344 | 342 | 345 | 340 | 375 | 376 | 373 | 385 |
| 50 | 368 | 364 | 368 | 358 | 345 | 345 | 347 | 346 | 376 | 377 | 375 | 390 |
| 60 | 370 | 366 | 371 | 368 | 346 | 347 | 349 | 348 | 377 | 379 | 380 | up to |

TABLE 2-continued

Boiling analyses
All heat carriers were heat treated in a pressure vessel at the temperatures stated over 500 hours.
The evaluation is carried out according to ASTM 1078.

| | Fluid of the present invention | | | | Comparison fluid A | | | | Comparison fluid B | | | |
| --- | --- | --- | --- | --- | --- | --- | --- | --- | --- | --- | --- | --- |
| % by vol. | Orig. | 350° C. | 360° C. | 370° C. | Orig. | 350° C. | 360° C. | 370° C. | Orig. | 350° C. | 360° C. | 370° C. |
| 70 | 372 | 368 | 375 | 379 | 350 | 352 | 355 | 355 | 378 | 380 | 388 | 400 |
| 80 | 374 | 371 | 380 | 382 | 359 | 361 | 365 | up to 400 | 379 | 390 | up to 400 | |
| 90 | 378 | 376 | 390 | 395 | 383 | 385 | up to 400 | | 380 | up to 400 | | |
| 95 | 382 | 380 | 395 | up to 400 | up to 400 | up to 400 | | | 381 | | | |
| 98 | 391 | 387 | up to 400 | | | | | | 383 | | | |

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A method of transferring heat over an expanded temperature range in a thermodynamic system, comprising:
   transferring heat with a heat transfer medium which comprises at least an effective amount of one fluid of the formula I or II or both:

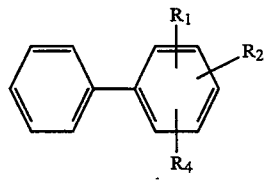  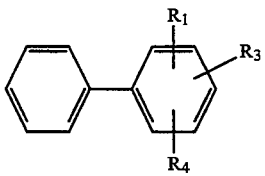

I  II wherein $R^1$ is ethyl or hydrogen, $R^2$ ethyl, $R^3$ is methyl and $R^4$ is a benzyl radical.

2. The method of claim 1, wherein said medium further comprises at least one or more compounds of the formula III or IV or both:

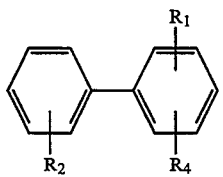  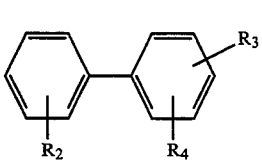

III  IV where in $R_1$ is ethyl or hydrogen, $R_2$ is ethyl, $R_3$ is methyl and $R_4$ is benzyl.

3. The method of claim 1, wherein said compound of formula I or II is benzylethyldiphenyl, benzylethylmethyldiphenyl, benzyldiethyldiphenyl, benzyldiethylmethylidiphenyl or benzylmethyldiphenyl.

4. The method of claim 1, wherein said heat transfer is effected at a temperature of from about −26° C. to about 390° C.

5. The method of claim 1, wherein heat transfer medium is selected from the group consisting of benzylethyldiphenyl, benzylethylmethyldiphenyl, benzyldiethyldiphenyl, benzyldiethylmethylidiphenyl and benzylmethyldiphenyl and mixtures thereof.

* * * * *